United States Patent [19]

Fraser

[11] Patent Number: 4,818,051
[45] Date of Patent: Apr. 4, 1989

[54] OPTICAL BUS
[75] Inventor: Charles D. Fraser, Lakewood, Colo.
[73] Assignee: US West Advanced Technologies, Inc., Englewood, Colo.
[21] Appl. No.: 83,664
[22] Filed: Aug. 10, 1987
[51] Int. Cl.⁴ .................................................. G02B 5/14
[52] U.S. Cl. ................................ 350/96.16; 350/96.15
[58] Field of Search ................ 350/96.16, 96.15, 96.19

[56] References Cited

U.S. PATENT DOCUMENTS

| | | | |
|---|---|---|---|
| 4,070,091 | 1/1978 | Taylor et al. | 350/96 WG |
| 4,136,929 | 1/1979 | Suzaki | 350/96.15 |
| 4,245,884 | 1/1981 | Magura et al. | 350/96.16 |
| 4,315,666 | 2/1982 | Hicks, Jr. | 350/96.15 |
| 4,342,499 | 8/1982 | Hicks, Jr. | 350/96.15 |
| 4,343,532 | 8/1982 | Palmer | 350/96.19 |
| 4,366,565 | 12/1982 | Herskowitz | 350/96.16 X |
| 4,473,270 | 9/1984 | Shaw | 350/96.15 |
| 4,511,207 | 4/1985 | Newton et al. | 350/96.16 |
| 4,557,552 | 12/1985 | Newton et al. | 350/96.19 |
| 4,558,920 | 12/1985 | Newton et al. | 350/96.15 |

Primary Examiner—James W. Davie
Attorney, Agent, or Firm—Christensen, O'Connor, Johnson & Kindness

[57] ABSTRACT

An optical bus for distributing a light wave signal to a plurality of receivers. The optical bus (10) includes a generally cylindrical form (12) having a helical groove (14) inscribed on its outer surface. At a plurality of nodes (30), an optical fiber (16) wound about the form within the helical groove is caused to bend through a radius of curvature (22) sufficiently small so that a portion of the light propagating along the fiber is transmitted outside the fiber. A plurality of light detectors (26) are disposed at each of the nodes and are operative to produce an electrical signal corresponding to the portion of the light wave signal that is transmitted outside the fiber. The electrical signals are input to an electronic cross-connect matrix (108) and are selectively connected to a plurality of LEDs (112, 116, 120, 124) which each produce a light wave signal corresponding to the electrical signal for distribution to a receiver through a network of distribution optical fibers (126, 128, 130, 132).

20 Claims, 4 Drawing Sheets

OPTICAL BUS

TECHNICAL FIELD

The present invention generally pertains to an apparatus for distributing a signal to a plurality of freceivers, andmore specifically, to an optical fiber distribution system.

BACKGROUND INFORMATION

Cable television systems presently distribute signals to millions of television receivers in homes throughout the country over a distribution network of copper conductor coaxial cable. Although the quality of the signals provided each subscriber is generally better than could be achieved using an antenna system at each receiver site, the coaxial cable distribution system suffers from bandwidth limitations and noise problems that are inherent to coaxial conductors and to the amplifiers used with them.

A substantial improvement in the quality of the signals distributed might be obtained by using optical fibers to distribute the television signals either in analog form, or as the technology develops and digital TV receivers become commonly available, in digital form. However, the cost of implementing an optical fiber distribution system linking individual television receivbers to a central source station has previously been considered prohibitive. If each customer were linked to the central station by a single optical fiber for each channel, the size of the distribution cables, the labor cost to install the system and the number of splices required would be enormous. Clearly, such a system is not practical nor cost effective.

An alternate approach would be to distribute each of the video signals over an optical fiber from a source station to each of a plurality of distribution centers, and then to distribute the signals to each receiver connected to the distribution centers by separate distribution optical fibers. As is customary in existing cable systems using coaxial cables, a basic service could be provided to each customer, with additional stations or services being made available to the customer at an added cost. Although scrambler technology could be used to encode extra cost programming, it would be preferable to transmit each extra cost channel separately to the distribution centers, and then distribute them to specific subscribers who have paid for the option. The optical fiber distribution system should thus be able to selectively connect a specific subscriber to a particular signal propagated to the distribution center from the central station.

In addition, it would be desirable for the optical fiber distribution system to support bidirectional communication between the receivers and the central station, thereby enabling customers to select specific extra cost programming, participate interactively in surveys, order merchandise marketed on a video channel, etc. Coaxial cable systems are presently incapable of supporting bidirectional communications, except on a very limited basis.

To effectively implement the above-described fiber optic distribution system, a device is required that is capable of replicating a light wave signal for distribution to a plurality of receivers. The prior art includes beam splitters for dividing an input signal between two fiber optic cables, but this would not provide an acceptable solution where the same light wave signal must be distributed to several hundred subscribers, nor would it sufficie for bidirectional communications.

SUMMARY OF THE INVENTION

The present invention is directed to solving the above-defined problem, and is an optical bus comprising an optical fiber having a light wave signal input at one end for replication and distribution to a plurality of receivers. The optical fiber is coiled about a form which includes a plurality of radially extending nodes. The optical fiber is deflected through a radius of curvature at each node that is sufficient to cause a part of the input light wave signal propagating through the optical fiber to be transmitted outside the fiber.

One or more light sensitive devices are disposed at each of the plurality of nodes, and are operative to receive the part of the light wave signal that is transmitted outside the fiber and to produce an electrical signal corresponding to the input light wave signal. Means are connected to the plurality of light sensitive devices for producing a light wave signal corresponding to the electrical signal in each of a plurality of distribution optical fibers. The signals propagating through the distribution optical fibers are each replicas of the input light wave signal and are thus distributed to a network of receivers.

In one embodiment of the present invention, the means connected to the light sensitive devices for producing a light wave signal corresponding to the electrical signals comprise a switching matrix for selectively connecting the electrical signals to selected light emitting diode (LED) light sources. Since the LEDs are each connected to specific receivers in the network via the distribution optical fibers, the switching matrix is effective to connect the replica of the original light wave signal to a specific receiver.

In a further embodiment, two or more light sensitive devices having different spectral sensitivities are disposed at each node on the optical bus. The light sensitive devices are each able to produce an electrical signal corresponding to a light wave signal of a spectral wavelength to which the particular light sensitive device is responsive. The electricl signals are input to a switching matrix and are thereby selectively connected to a plurality of LED light sources. The LEDs each produce a corresponding light wave signal that passes through a distribution optical fiber to one of a plurality of receivers in a network. In this manner, a wave division multiplex light wave signal input to the optical bus may be split into its component signals, and each of the component signals replicated and selectively distributed to specific receivers in the network.

The distribution optical fibers may also be used for bi-directional communication wherein a receiver station transmits a responding light wave signal at a different spectral wavelength than the received signal. The responding light wave signal is input to a second optical fiber formed in a loop, and an electrical signal is produced by a light sensitive detector, which corresponds to the responding light wave signal. This electrical signal is multiplexed with other similar electrical signals from other receiver stations and converted to a light wave signal for transmission back to the central source station. As used herein, the term "responding" is used to indicate a signal originating at a receiving station that normally functions to receive signals from the central source station, and is not intended to imply that all signals originated by the receiving station are in fact in response to signals from the central source station.

A method for distributing a light wave signal to a plurality of receivers in a network is also claimed, corresponding to the above-described apparatus.

DESCRIPTION OF THE PREFERRED EMBODIMENTS

Figure 1:
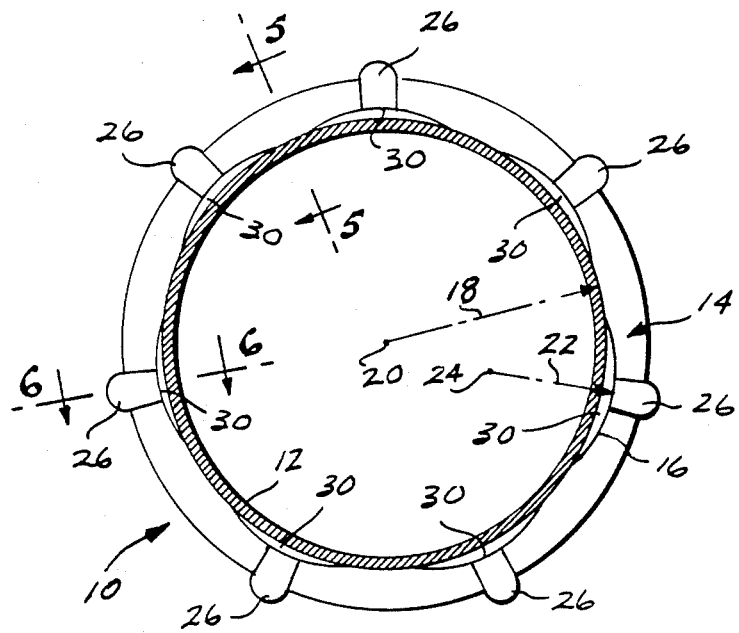
FIG. 1 is a cross-sectional end view of a first embodiment of an optical bus.
Figure 2:
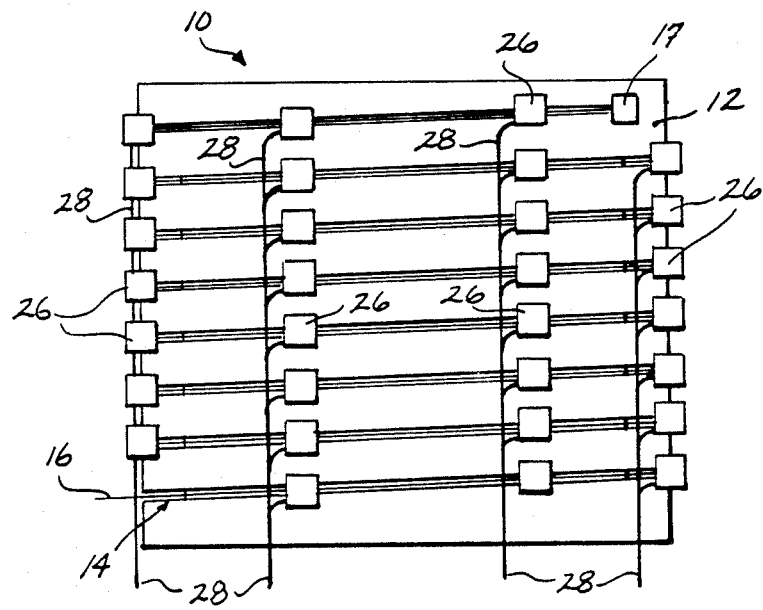
FIG. 2 is an elevational view of a first embodiment of an optical bus.

As shown in FIGS. 1 and 2, an optical bus 10 includes a generally cylindrical form 12, either solid or tubular, having an open helical groove 14 disposed around its outer circumference. Form 12 may be made from metal, a resin coated fiber, molded plastic, or other suitable material. Depending on the material comprising form 12, helical groove 14 may preferably be either machined or cast into the outer surface of the form. An optical fiber 16 is wound around form 12 within helical groove 14, following the pitch of the groove from one end of the form to the other.

A light wave signal may be input to either or both ends of optical fiber 16 from any suitable connected source. In the first preferred embodiment shown in FIG. 2, the light wave signal is input to the end of optical fiber 16 on the lower left of the FIG. At the upper right of FIG. 2, optical fiber 16 is terminated in a "black hole" attenuator 17. The term "black hole" attenuator describes a device which is operative to absorb substantially all the light which enters it, reflecting almost none of the input light. Such devices are well known to those skilled in the art and are readily available.

The radially inner surface of helical groove 14 has a nominal radius of curvature 18 about the longitudinal axis 20 of form 12. At a plurality of nodes 30, the radius of curvature decreases so that it is less than a critical radius of curvature characteristic of the optical fiber 16. The critical radius of curvature characteristic of an optical fiber is defined as the minimum radius about which the optical fiber may be bent without experiencing a partial loss in a light wave signal propagating through the optical fiber due to transmission of the light wave signal outside the fiber. As shown in FIG. 1, the radius of curvature 22 for one of the nodes 30 is defined about a point 24 and is representative of the radius of curvature of all nodes 30. Radius of curvature 22 is selected to be less than the critical radius of curvature for optical fiber 16 to ensure that a light wave signal propagating through the optical fiber is partially transmitted outside the fiber at each of nodes 30 instead of being entirely internally reflected as it propagates along the longitudinal axis of the fiber. When an optical fiber is intended for use in carrying a signal between disparate points, transmission of the signal outside the outer surface of the optical fiber is considered an undesirable loss; however in optical bus 10, "leakage" of the signal through the outer surface of optical fiber 16 at each node 30 is essential.

Disposed at spaced-apart intervals around the circumference of form 12 at each of nodes 30 are light sensitive detectors 26. Light sensitive detectors 26 are positioned to detect the portion of the light wave signal propagating through optical fibers 16 which is transmitted outside the fiber at each of the nodes 30 and to produce an electrical signal corresponding to the light wave signal, which is conveyed through electrical leads 28.

Figure 6:
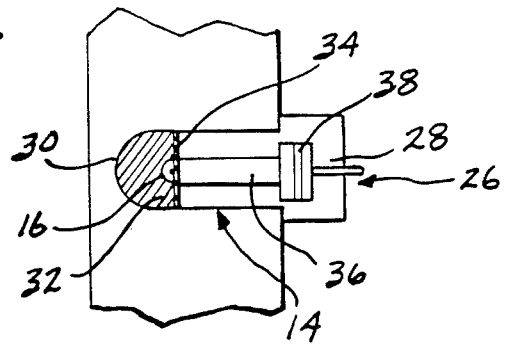
FIG. 6 is a cutaway, cross-sectional view of the optical bus taken along section lines 6—6 of FIG. 1.

In a first preferred embodiment of the invention, light sensitive detectors 26 each comprise a single avalanche photodiode 36 having an electrical output directly connected to a line driver 38, as shown in FIG. 6. Alternatively, a PIN diode, or other device suitable for producing an electrical signal corresponding to an incident light wave signal could be used in place of avalanche photodiode 36. To improve the coupling between the optical fiber 16 and avalanche photodiode 36, a layer of index matching gel 34 is provided intermediate the optical fiber and the light sensitive opening or window (not shown) into avalanche photodiode 36. Since a relatively small percentage of the light wave signal propagating through optical fiber 16 is transmitted outside of the optical fiber at each node 30, index matching gel 34 may be required to insure that the light transmitted through the fiber surface is not refracted away from avalanche photodiode 36 (or other light sensitive device), as might occur if there were an air gap between the fiber and detector. Optionally, the layer of index matching gel 34 may extend over substantially the entire length of helical groove 14.

Since optical fiber 16 may be supplied with a plastic coating or cladding 40 on its outer surface, which would interfere with detection of the light transmitted outside the fiber, it is necessary to remove cladding 40 at each of the nodes 30, either with a chemical solvent or by abrasively scraping the cladding away on the side of the optical fiber 16 which is exposed to avalanche photodiode 36. Between nodes 30, as shown in the cross section of FIG. 5, cladding 40 may be left intact.

Figure 5:
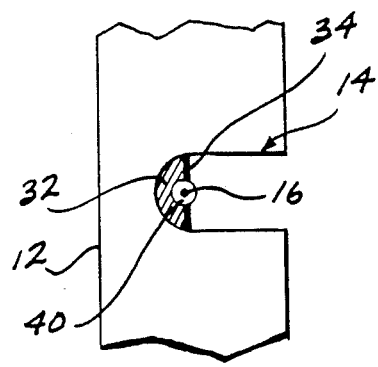
FIG. 5 is a cutaway, cross-sectional view of the optical bus taken along section lines 5—5 of FIG. 1.

FIGS. 5 and 6 also illustrate the use of a foam material 32 in the bottom of helical groove 14 to act as a precautionary cushion for optical fiber 16, minimizing the risk that the optical fiber may be broken as it is installed within the groove or subsequently, when stressed due to unequal thermal expansion of the components. If helical groove 14 has a constant depth or radius of curvature, the depth of foam 32 may be used to define radius of curvature 22 at each of nodes 30. It is contemplated that helical groove 14 would initially be completely filled with foam 32 over its entire length and after curing, the foam would be machined to a predetermined variable depth, thereby defining each of nodes 30. Alternatively, helical groove 14 can be machined or molded to a variable depth to define nodes 30 and a uniform thickness of cushioning foam 32 laid down or injected within helical groove 14.

Figure 3:
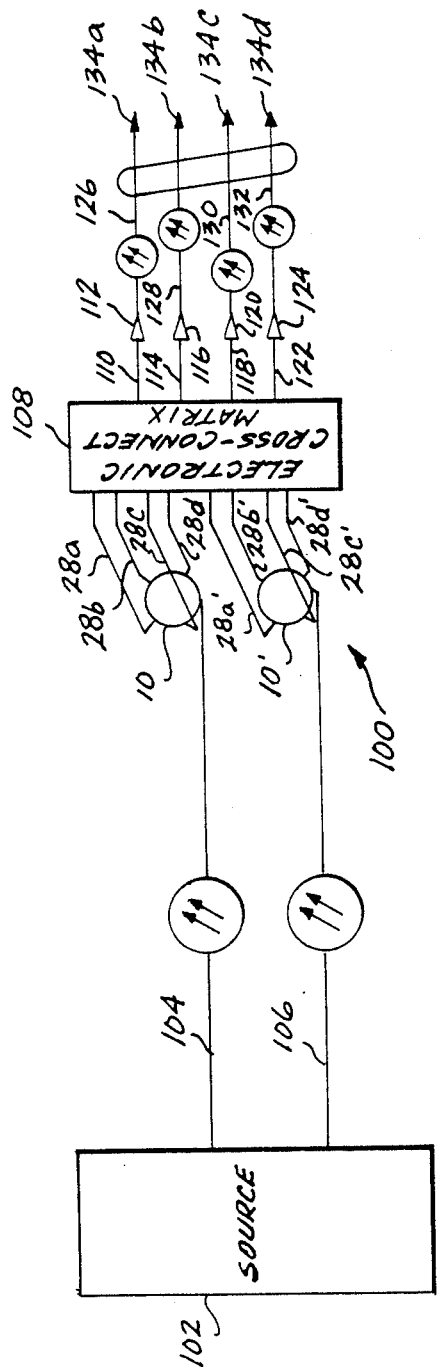
FIG. 3 is a schematic block diagram showing two optical buses used in an optical fiber distribution network.

Turning now to FIG. 3, an optical fiber distribution system 100 is shown, which includes a first and second optical bus 10 and 10', respectively. It will be understood that the representation shown in FIG. 3 is a simplified block diagram, and that such a distribution system would likely include many more optical buses similar to 10. Likewise, although each of the optical buses 10 and 10' are shown as having only four output leads 28a through 28d and 28a' through 28d', respectively, it will be apparent that many more such electrical leads 28 and 28' might be provided from each of the optical buses.

Optical fiber distribution system 100 is offered as an example to illustrate simplistically the use of the optical bus 10 for replicating a light wave signal and distributing it to a plurality of end receivers. As shown in FIG. 3, a central station 102 comprises a source of two light wave signals 104 and 106, which are input to optical buses 10 and 10', respectively. Light wave signals 104 and 106 carry information, audio-video signals, or data transmitted from central station 102 for distribution to a network of receivers. As described previously with reference to FIGS. 1 and 2, it will be understood that light wave signal 104 enters optical bus 10 over optical fiber 16, and at each of nodes 30 is partially transmitted outside of the optical fiber, where it causes light sensitive detectors 26 to produce a corresponding electrical signal propagated through leads 28. Leads 28a through 28d thus carry an electrical signal corresponding to the input light wave signal 104. Optical bus 10' functions in an entirely analogous manner, so that leads 28a' through 28d' carry an electrical signal corresponding to light wave signal 106.

Both groups of leads, 28 and 28', are input to an electronic cross-connect switching matrix 108. Although shown as having only two sets of discrete signals input via leads 28 and 28', electronic cross-connect matrix 108 may be thought of as representing an "nx by n" matrix having "nx" input ports and "n" output ports, where "x" equals the number of discrete input signals. In the example of FIG. 3, electronic cross-connect matrix 108 has only two discrete input signals, therefore, x equals 2. Since there are four signals on each of the leads 28 and 28', there are eight input ports and four output ports on cross-connect matrix 108. The function of electronic cross-connect matrix 108 is to selectively connect one of the x discrete input signals to a particular one of the output ports. Thus, any one of the output ports may be connected to any of the input signals, and all of the output ports may be connected to receive the same input signal. By way of example, the electrical signal on lead 28a may be connected by cross-connect matrix 108 to an output lead 110, while the electrical signal on lead 28a' is connected to an output lead 114. Alternatively, the signal on each of electrical leads 28a through 28d may be connected respectively to each of output leads 110, 114, 118, and 122; or, the signal on each of leads 28' may be connected to each of the output leads.

An electrical signal on output lead 110 is operative to energize a light source which in the preferred embodiment comprises a light emitting diode (LED) 112, thereby producing a light wave signal corresponding to the electrical signal on lead 110. Those skilled in the art will appreciate that other suitable light sources such as a laser may be used in place of the LED. The light wave signal produced by LED 112 is propagated over a distribution optical fiber 126 to a receiver 134a. Similarly, LED's 116, 120, and 124 are operative to produce light wave signals corresponding respectively to the electrical signals on output leads 114, 118 and 122, which are propagated through optical fibers 128, 130, and 132 to end receivers 134b, 134c, and 134d, respectively. Thus, if light wave signal 104 represents a television channel, it may be propagated to one or all of receivers 134a through 134d, depending upon the switching cross-connect provided by electronic cross-connect matrix 108. Furthermore, a second television channel carried by light wave signal 106 may also be propagated to one or all of receivers 134a through 134d.

Distribution system 100 requires a separate transmission optical fiber for each of the discrete light wave signals input to electronic cross-connect matrix 108, and a separate optical bus similar to optical bus 10 for each such signal. The optical buses, the electronic cross-connect matrix, and the distribution LED's would likely be located at a distribtuion center, e.g., at a location serving a subdivision or other localized group of subscribers having up to several hundred receivers. Control of the electronic cross-connect matrix 108 may be implemented in response to a signal produced by each of receivers 134 as a particular channel is selected for viewing, or it may be controlled by a signal from the central station 102.

Figure 4:
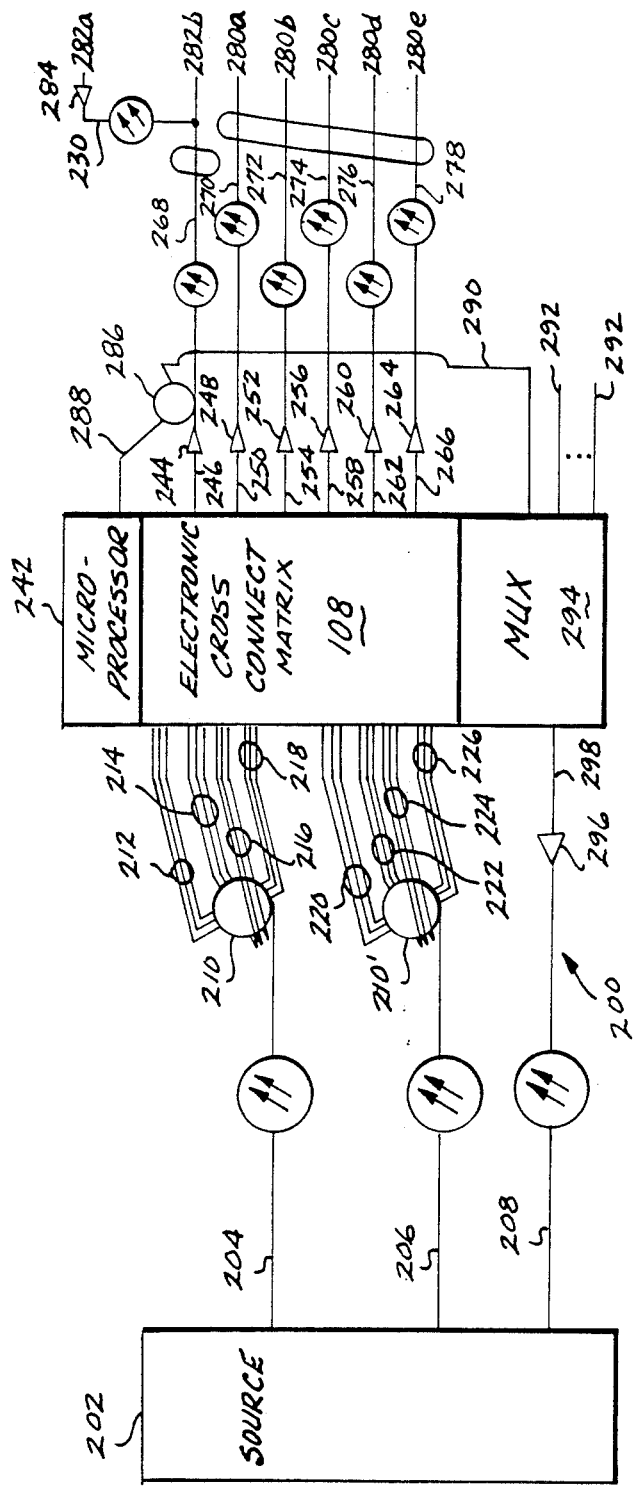
FIG. 4 is a schematic block diagram of an optical fiber distribution network incorporating two optical buses having a capacity for wave division multiplex operation.
Figure 7:
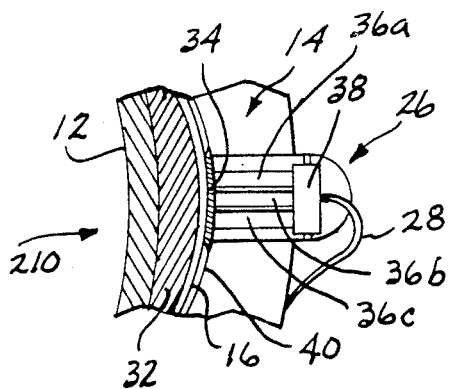
FIG. 7 is an enlarged cross-sectional view of a node on an embodiment of the optical bus intended for use in a wave division multiplexing distribution system.

Turning now to FIG. 4, a more complex optical fiber distribution network 200 is shown wherein wave division multiplexed light wave signals 204 and 206 are transmitted over separate optical fibers from a central station 202 to optical buses 210 and 210'. A wave division multiplexed light wave signal includes a plurality of component signals carrying data or information within different spectral bandwidths or frequency ranges. In order to receive each of the component signals that are thus multiplexed, optical buses 210 and 210' differ from the simpler optical bus 10 described above primarily with regard to light sensitive detector 26. As shown in FIG. 7, the embodiment of the invention comprising optical bus 210 (and 210') includes a light sensitive detector 26 having three avalanche photodiodes 36 arranged at each of nodes 30. Each of the avalanche photodiodes 36a through 36c differs from the others with regard to their spectral sensitivity. Thus, avalanche photodiodes 36a is sensitive to light of one range of wavelengths, while avalanche photodiode 36b is responsive to another range of wavelengths, and avalanche photodiode 36c to yet still another range of wavelengths. Line driver 38 is operative to separately amplify the electrtical signal produced by each of avalanche photodiodes 36a through 36c, producing three amplified electrical signals corresponding to the component light wave signals propagated through optical fiber 16. Electrical signals produced by line drivers 38 are thus conveyed through leads 28 via a series of discrete conductors 212 through 218, and with reference to optical bus 210' shown in FIG. 4, through conductors 220 through 226 to input ports on electronic cross-connect matrix 108. A microprocessor 242 is connected to the electronic cross-connected matrix 108 and is operative to control the cross connections provided by the electronic cross-connect matrix between its input ports and its output ports. The output ports are connected to leads 246, 250, 254, 258, 262 and 266, respectively.

As explained above, an electronic cross-connected matrix such as matrix 108 is operative to selectively connect any one of its input ports to a selected output port. Any of the three component signals on wave division multiplexed signal 204 may thus be replicated by optical bus 210 as a corresponding electrical signal which is cross connected through electronic cross-connect matrix 108 to one of the output leads 246, 250, 254, 258, 262, and 266. At each of nodes 30 on optical bus 210 as shown in FIG. 7, electrical signals corresponding to the component parts of wave division multiplexed light wave signal 204 are detected by one of avalanche photodiodes 36a, 36b, or 36c and a corresponding electrical signal produced as an input to electronic cross-connect matrix 108. The output ports of electronic cross-connect matrix 108 provide an electrical signal as an input to one of the LED's 244, 248, 252, 256, 260 and 264 which are operative to produce a light wave signal corresponding to the electrical signal input to the LED's for propagation over distribution optical fibers 268, 270, 272, 274, 276 and 278, respectively.

The wave division multiplexed light wave signal 206 is likewise replicated by optical bus 210' and similarly connected to and distributed by the above referenced distribution optical fibers, as determined by electronic cross-connect matrix 108.

The function of distribution optical fiber 268 differs from that of the other distribution optical fibers in distribution system 200 by virtue of its being used for bidirectional communication. Optical fiber 268 is connected to a combination receiver/transmitter 282 which is operative to both receive the distribution light wave signal conveyed over optical fiber 268 and to transmit a responding electrical signal as an input to LED 284, causing the LED to produce a light wave signal 230 that is also conveyed over bidirectional distribution optical fiber 268. The light wave signal 230 produced by LED 284 may have a different spectral wavelength than that of the light wave signal produced by LED 244. The transmitted signal 230 is propagated through optical fiber 268 around a smaller optical bus 286 where at each of two nodes equivalent to nodes 30 in the first embodiment of optical bus 10, a portion of the light wave signal is transmitted outside the optical fiber to a light sensitive detector (not shown) which is similar to detector 26 and which is sensitive to light of the wavelength produced by LED 284, and produces a corresponding electrical signal. The electrical signal from one of these nodes is transmitted through a conductor 288 to microprocessor 242, while the electrical signal from another of the nodes is transmitted through a conductor 290 to a multiplexer 294. When a signal on conductor 288 is input to the microprocessor, it causes multiplexer 294 to transmit a time division multiplexed electrical signal carrying the information conveyed via conductor 290, through an output conductor 298 to an LED 296. LED 296 produces a corresponding time division multiplexed light wave signal 208 for transmission back to the central source 202.

A plurality of other bidirectional distribution optical fibers (not shown), which are similar to optical fiber 268, may produce an electrical signal input to multiplexer 294 over leads 292. Microprocessor 242 controls multiplexer 294 enabling it to select specific input signals for output over conductor 298 as time division multiplexed electrical signals, as previously described above.

It will be apparent that many optical buses similar to optical bus 210 may be connected for input to electronic cross-connect matrix 108, each producing a plurality of replicate electrical signals corresponding to a component of the wave division multiplex signal that it input to the optical bus. In this manner, optical fiber distribution system 200 could transmit a substantial number of television signals from a central source 202, to a distribution center where each of the optical buses, microprocessor, electronic cross connect matrix, multiplexer, and LED's for producing the distribution signal are located. Selected receivers of the distributed signals might be provided the bidirectional capability afforded by optical bus 286 and bidirectional distribution optical fiber 268. Subscribers to the bidiretional service would for example, be able to select specific programming, order merchandise advertised over the television, respond to televised surveys, be provided with enhanced home security, etc. All of the features of the optical fiber distribution system 200 as described above can be implemented with presently available technology using the optical bus 210 as a mechanism for replicating an input light wave signal for distribution to a plurality of receivers.

In its simplest form, the optical bus may comprise one or more loops of an optical fiber, each loop being constrained to have a radius of curvature less than the critical radius of curvature. A light wave signal input to the optical fiber loop(s) is transmitted outside the optical fiber along the entire length of each loop and is detected by light sensitive detectors disposed along the length of the optical fiber. Each light sensitive detector produces a corresponding electrical signal that is used to drive a light source to produce a corresponding distribution light wave signal. This form of the optical bus might be used for optical bus 286 (in FIG. 4); it is not otherwise illustrated.

Although the present invention has been described with respect to several preferred embodiments and modifications thereto, further modifications will be apparent to those skilled in the art. Accordingly, it is not intended that the invention be limited by the disclosure of by such modifications, but instead that its scope should be determined entirely by reference to the claims which follow hereinbelow.

The embodiments of the invention in which an exclusive property or privilege is claimed are defined as follows:

1. An optical bus comprising:
   (a) an optical fiber through which a light wave signal produced by a primary source input at one end propagates, the optical fiber being formed in a loop, which at least at one point, has a radius of curvature sufficiently small that the light wave signal is incident on an internal surface of the optical fiber at an angle in excess of which the light wave signal may fully reflect internally, causing part of the light wave signal to be transmitted through the optical fiber surface at said point;
   (b) a photodetector disposed at said point, which is responsive to the part of the light wave signal transmitted through the optical fiber surface to produce a corresponding electrical switch;
   (c) a light source electrically connected to the photodetector, and responsive to the electrical signal produced thereby to produce a corresponding light wave signal that is a replica of the light wave signal produced by the primary source; and
   (d) a distribution optical fiber, one end of the distribution optical fiber being optically coupled to the light source and the other end of the distribution optical fiber being terminated at a receiver, so that the replica of the light wave signal produced by the primary source is distributed thereby to the receiver.

2. The optical bus of claim 1, wherein the optical bus comprises a light wave signal distribution system, and wherein the optical fiber has a radius of curvature sufficiently small to cause the light wave signal to be transmitted through the optical fiber surface at a plurality of points, at least one of a plurality of photodetectors being disposed at each point, and operative to produce an electrical signal corresponding to the light wave signal, each photodetector being connected to matrix means for selectively distributing the electrical signals to one of a plurality of light sources.

3. The optical bus of claim 1, further comprising a generally cylindrical form, the loop of the optical fiber comprising a helical coil about the form.

4. The optical bus of claim 3, wherein the form, at said point, is operative to deflect the optical fiber through said radius of curvature causing part of the light wave signal to be transmitted through the surface of the optical fiber.

5. The optical bus of claim 1, wherein the photodetector comprises a line driver and one of an avalanche photodiode and a PIN diode.

6. The optical bus of claim 1, wherein two or more photodetectors having different special sensitivities are disposed at said point, and wherein the light wave signal produced by the primary source comprises a wave division multiplexed signal having a plurality of component signals, each component signal being propagated through the optical fiber formed in the loop by light having a substantially different wavelength than the other component signals, the wavelengths of the component signals corresponding respectively to the spectral sensitivity of the photodetectors at said point, said photodetectors thereby each producing an electrical signal corresponding to the light of the component signal having a wavelength to which they are sensitive.

7. The optical bus of claim 6, further comprising cross connect means for connecting selected ones of the electrical signals produced by the photodetectors to a specific light source for propagation through the distribution optical fiber to the receiver.

8. An optical bus comprising:
  (a) an optical fiber coiled about a form, the form including a plurality of nodes which deflect the optical fiber through a radius of curvature that is less than a critical radius of curvature associated with the optical fiber, thereby causing a part of a light wave signal propagating through the optical fiber to be transmitted outside the fiber at each node;
  (b) one or more light sensitive devices diposed at each of the plurality of nodes, and operative to receive the part of the light wave signal that is transmitted outside the optical fiber at the node and to produce a corresponding electrical signal; and
  (c) means connected to the plurality of light sensitive devices, for producing a light wave signal corresponding to the electrical signal in each of a plurality of distribution optical fibers connected to a network of receivers.

9. The optical bus of claim 8, wherein the one or more light sensitive devices at each of the nodes comprise one of an avalanche photodiode and a PIN diode.

10. The optical bus of claim 8, wherein the means connected to the plurality of light sensitive devices comprise a switching matrix for selectively connecting the electrical signals produced by the light sensitive devices to selected ones of a plurality of light sources, said light sources each being connected by a distribution optical fiber to a specific receiver in the network.

11. The optical bus of claim 8, wherein two or more light sensitive devices having different spectral sensitivities are disposed at each node, and are each operative to produce an electrical signal corresponding to a light wave signal of a spectral wavelength to which the particular light sensitive device is sensitive.

12. The optical bus of claim 8, wherein the coiled optical fiber is terminated in an attenuator at one end and the light wave signal is input at the other end.

13. The optical bus of claim 8, wherein the light wave signal propagating through the optical fiber coiled about the form is input at either end of the optical fiber and the light sensitive devices are sensitive to a wavelength of the light wave signal input at one end but not to a different wavelength of the light wave signal input at the other end of the optical fiber.

14. A method for distributing a light wave signal to a plurality of receivers comprising the steps of:
  (a) propagating the light wave signal through an optical fiber that at a plurality of points is formed in a curve having a sufficiently small radius of curvature to cause a portion of the light wave signal to be transmitted outside the optical fiber;
  (b) detecting the portion of the light wave signal that is transmitted outside the optical fiber at each of the points;
  (c) producing an electrical signal corresponding to the detected light wave signal at each of the points;
  (d) producing a distribution light wave signal corresponding to the electrical signal for each of the points; and
  (e) distributing the distribution light wave signals over a distribution optical fiber network.

15. The method of claim 14, wherein the optical fiber is wrapped about a form, the form defining the radius of curvature of the optical fiber.

16. The method of claim 14, wherein the light wave signal propagated through the optical fiber is a wave division multiplexed signal having a plurality of component signals, each associated with a diferent spectral wavelength of the light wave signal.

17. The method of claim 16, wherein the plurality of component signals are separately detected as the portion of the light wave signal is transmitted outside the optical fiber, wherein the step of producing an electrical signal further includes the step of producing electrical signals corresponding to at least one of the plurality of component signals.

18. The method of claim 17, wherein the step of producing the distribution light wave signal further comprises the step of selecting one of the electrical signals for use in producing each of the distribution light wave signals.

19. The method of claim 14, wherein the light wave signal may be propagated in both directions through the optical fiber formed in the curve.

20. The method of claim 19, further comprising the steps of:
  (a) propagating a responding light wave signal produced by a receiver of the distribution light wave signal through a second optical fiber that is formed in a curve, a portion of the responding light wave signal being transmitted outside said second optical fiber;
  (b) detecting the portion of the responding light wave signal;
  (c) producing a responding electrical signal corresponding to the detected responding light wave signal; and
  (d) producing a light wave signal corresponding to the responding electrical signal.

* * * * *

UNITED STATES PATENT AND TRADEMARK OFFICE
CERTIFICATE OF CORRECTION

PATENT NO. : 4,818,051
DATED      : April 4, 1989
INVENTOR(S) : Charles D. Fraser It is certified that error appears in the above-identified patent and that said Letters Patent is hereby corrected as shown below:

Column 1, line 6, "freceivers" should be --receivers--;
Column 1, line 7, "andmore" should be --and more--;
Column 1, lines 28 and 29, "receivbers" should be --receivers--;
Column 2, line 2, "sufficie" should be --suffice--;
Column 6, line 42, "photodiodes 36a" should be --photodiode 36a--;
Column 9, line 49, "diposed" should be --disposed--;
Column 10, line 38, "diferent" should be --different--.

Signed and Sealed this

Second Day of January, 1990

Attest:

JEFFREY M. SAMUELS

Attesting Officer      Acting Commissioner of Patents and Trademarks